US010358854B1

(12) United States Patent
Guygaew

(10) Patent No.: US 10,358,854 B1
(45) Date of Patent: Jul. 23, 2019

(54) TAILGATE SYSTEM FOR A VEHICLE WITH ASTRIDE OPENING FEATURES

(71) Applicant: Wudthipong Guygaew, Cambridge, MA (US)

(72) Inventor: Wudthipong Guygaew, Cambridge, MA (US)

( * ) Notice: Subject to any disclaimer, the term of this patent is extended or adjusted under 35 U.S.C. 154(b) by 246 days.

(21) Appl. No.: 15/479,447

(22) Filed: Apr. 5, 2017

(51) Int. Cl.
| *E05D 15/48* | (2006.01) |
| *B60J 5/10* | (2006.01) |
| *B60J 5/12* | (2006.01) |
| *E05D 15/20* | (2006.01) |
| *E05D 15/56* | (2006.01) |
| *E05B 83/20* | (2014.01) |
| *E05B 81/08* | (2014.01) |
| *E05B 81/70* | (2014.01) |

(52) U.S. Cl.
CPC .............. *E05D 15/48* (2013.01); *B60J 5/106* (2013.01); *B60J 5/12* (2013.01); *E05B 81/08* (2013.01); *E05B 81/70* (2013.01); *E05B 83/20* (2013.01); *E05D 15/20* (2013.01); *E05D 15/565* (2013.01); *E05D 2015/485* (2013.01)

(58) Field of Classification Search
CPC ....... E05D 15/48; E05D 15/20; E05D 15/565; E05D 2015/485; E05B 81/70; E05B 81/08; E05B 83/20; B60J 5/12; B60J 5/106
USPC .......... 49/98, 103, 128, 129, 143, 209, 213; 296/51, 106, 216.04, 146.11, 146.13, 296/146.8, 56
See application file for complete search history.

(56) References Cited

U.S. PATENT DOCUMENTS

| 4,620,743 | A | | 11/1986 | Eke | |
| 6,007,139 | A | * | 12/1999 | Shave | B60J 5/101 296/146.8 |
| 6,068,327 | A | | 5/2000 | Junginger | |
| 6,318,782 | B1 | * | 11/2001 | Suzuki | B60J 5/106 296/106 |
| 6,454,341 | B2 | | 9/2002 | Tolinski | |
| 6,471,284 | B2 | * | 10/2002 | Landmesser | B60J 5/101 296/146.8 |
| 7,156,447 | B2 | * | 1/2007 | Watanabe | E05F 15/63 296/146.4 |
| 7,334,833 | B2 | * | 2/2008 | Koelbl | B60J 5/101 296/146.8 |

(Continued)

OTHER PUBLICATIONS

Electromagnetic Lock, article, Mar. 21, 2017, pp. 1-6, Wikipedia.

(Continued)

*Primary Examiner* — Brent W Herring
(74) *Attorney, Agent, or Firm* — Stan Collier, Esq.

(57) ABSTRACT

A means for opening tailgates of vehicles having a split tailgate with a lower door section and an upper door section. The upper door section would essential comprise the rear glass and mounting means of the upper door section to the vehicle. Further, it includes a pair of side guide tracks in the outer frame about the rear glass or panel. The lower door section includes at least four rollers for moving in the guide tracks. A locking and lifting handle in the lower door section releases the lower door to move vertically into the guide tracts. An upper detent or similar device would hold the lower door section on the outside of the upper door section when pushed to the upper extent. When the handle is release, the lower section would be locked to the upper door section.

14 Claims, 17 Drawing Sheets

(56) References Cited

U.S. PATENT DOCUMENTS

| | | | | |
|---|---|---|---|---|
| 7,370,905 B2* | 5/2008 | Watanabe | ............... | E05F 15/63 296/146.1 |
| 7,631,921 B2 | 12/2009 | Lewis et al. | | |
| 7,810,864 B2* | 10/2010 | Shimizu | ............... | E05F 15/46 296/146.4 |
| 7,828,366 B2* | 11/2010 | Andre | ............... | B60J 5/12 296/146.11 |
| 7,866,728 B2* | 1/2011 | Suzuki | ............... | E05F 15/70 296/146.4 |
| 8,132,846 B2* | 3/2012 | Kitayama | ............... | B60J 7/165 296/106 |
| 8,376,449 B2* | 2/2013 | Kitayama | ............... | B60J 1/1869 296/180.1 |
| 2002/0000726 A1* | 1/2002 | Zintler | ............... | E05B 81/90 292/216 |
| 2002/0060459 A1* | 5/2002 | Zintler | ............... | E05B 81/90 292/216 |
| 2002/0060479 A1 | 5/2002 | Tolinski et al. | | |
| 2002/0121798 A1* | 9/2002 | Landmesser | ............... | B60J 5/101 296/146.8 |
| 2004/0113456 A1* | 6/2004 | Greuel | ............... | E05F 15/622 296/146.8 |
| 2007/0085373 A1* | 4/2007 | Watanabe | ............... | E05F 15/63 296/146.8 |
| 2009/0121516 A1* | 5/2009 | Ljungqvist | ............... | B60J 5/101 296/146.8 |
| 2016/0060910 A1* | 3/2016 | Ben Abdelaziz | ............... | E05B 81/70 292/251.5 |
| 2018/0038139 A1* | 2/2018 | Zindler | ............... | E05B 81/20 |

OTHER PUBLICATIONS

Mortise Bolt Lock, 2-3/4 in. D, catalog, Mar. 21, 2017, https://www.grainger.com/product/SDC-Mortise-Bolt-Lock, pp. 1 to 4, grainger.com, US.

* cited by examiner

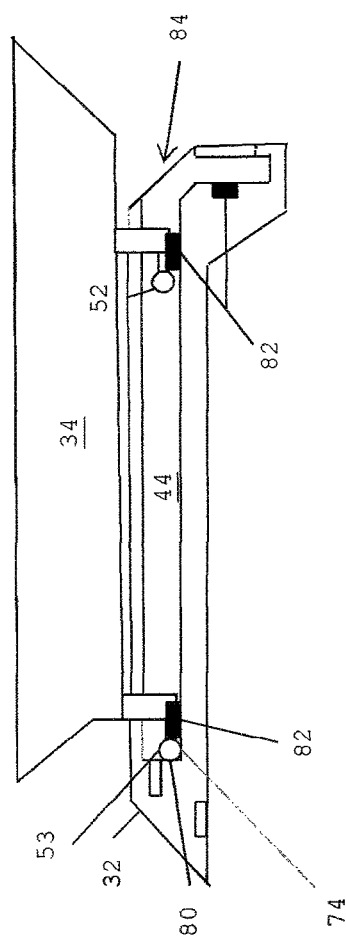

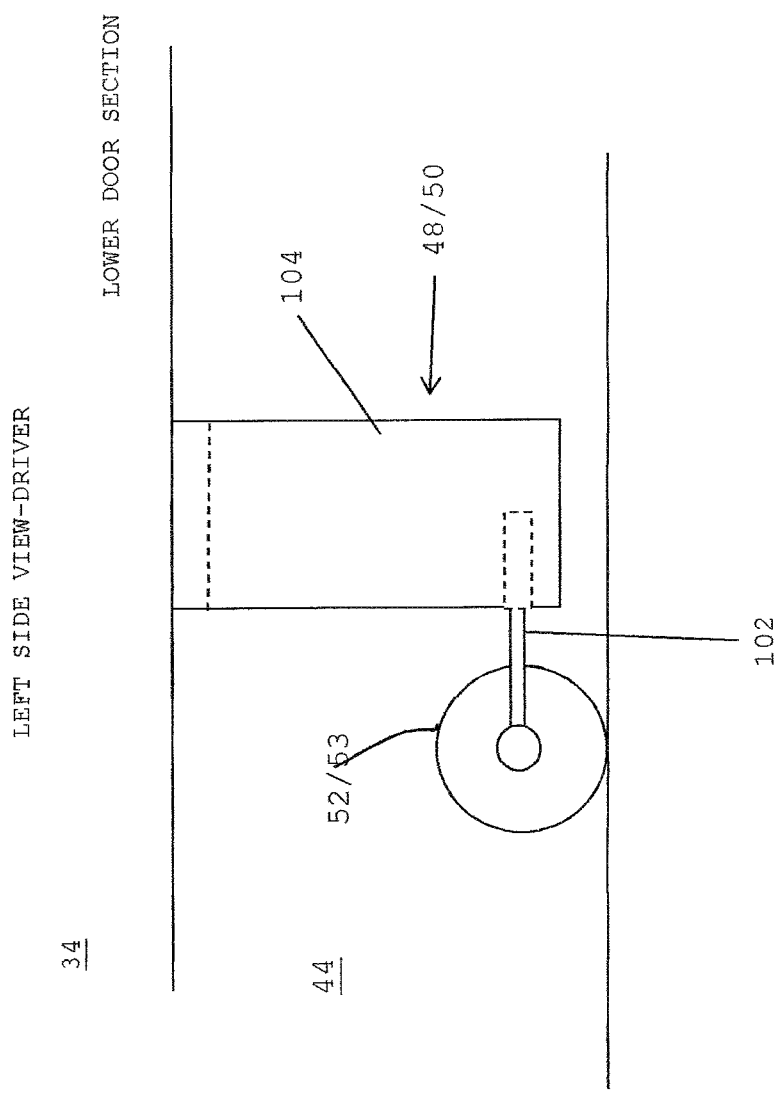

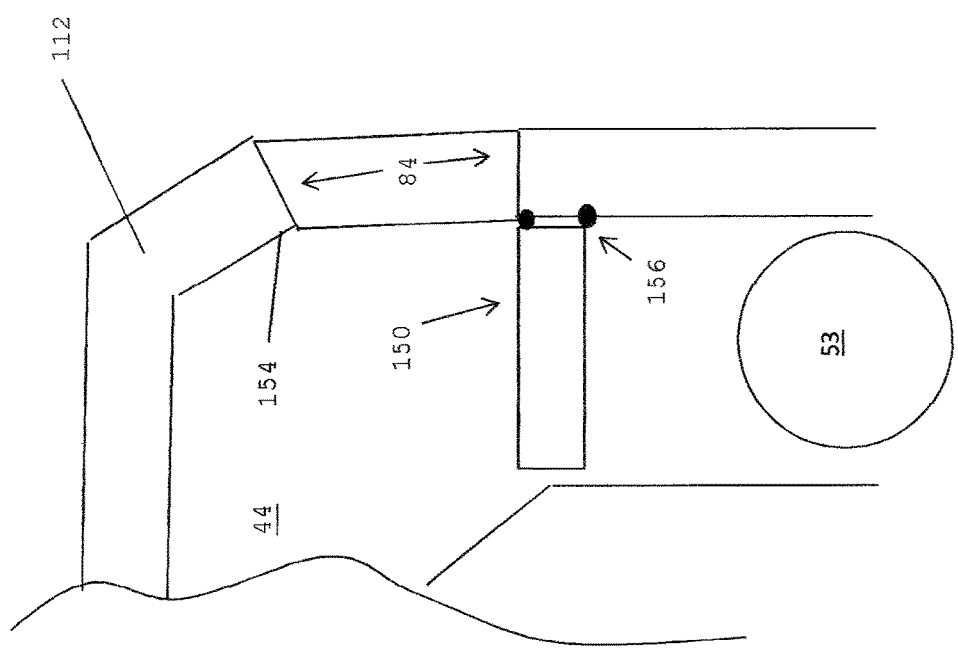

TAILGATE SYSTEM FOR A VEHICLE WITH ASTRIDE OPENING FEATURES

CROSS REFERENCES TO RELATED APPLICATIONS

NA

REFERENCE TO FEDERALLY SPONSORED RESEARCH OR DEVELOPMENT

NA

REFERENCE TO JOINT RESEARCH AGREEMENTS

NA

REFERENCE TO SEQUENCE LISTING

NA

BACKGROUND OF THE INVENTION

Field of the Invention

The present invention relates to vehicles like vans and minivan, and, more particularly, relates to vehicles like vans or minivans having a tailgate or lift gate, and, in greater particularity, relates to means for reducing the size of the tailgate when opened.

Description of the Prior Art

Gaining access to vehicles with storage areas open to tailgates is an important issue considering that the smaller vehicles have seats only accessible by side doors.

The conventional tailgate is a one piece tailgate being hinged at the top with a locking mechanism at the bottom. Positive struts further assist in keeping the tailgate up when opened. See for example, U.S. Pat. No. 7,631,921, FIG. 1 as to the single door/tailgate or liftgate. Although this has been the standard tailgate for many years, improvements to such have caused the tailgate to be split vertically with both sides hinged to the vertical frame.

U.S. Pat. No. 5,876,086 shows a tailgate having an upper door hinged upwards and a lower door split to open to a left and right side. US Patent Application Publication 2006/0152029 shows the upper door hinged upwards and the lower door hinged outward to the right. U.S. Pat. No. 5,786,086 shows the upper section or door hinged at the top to the roof and the lower door split vertically with hinges on the outer edges to the vertical frame. U.S. Pat. No. 6,068,327 shows a typical minivan having a tailgate with an upper section hinged to the roof and the lower section hinged to upper section at the opposite side as the roof hinge so that the lower section folds under the upper section. U.S. Pat. No. 6,418,667 shows an upper door section hinged to the roof and the lower section hinged to the opposite side as the roof hinge but only moving a small angle so that the upper profile is reduced to clear such obstacles as opened garage doors. U.S. Pat. No. 4,620,743 shows a truck cap with tracks in the top for allowing a rear door to be pushed onto the top of the cap. U.S. Pat. No. 6,454,341 shows a tailgate with the lower door hinged to the upper door. The lower door travels along guide tracks in the lower door frame until the bottom edge is separated from the tracks to allow the lower door to fold under the top door as shown in FIG. 3D. U.S. Pat. No. 7,631,921 shows a tailgate where the lower door and the upper door are not hinged together. After the upper door is fully opened, being hinged to the roof, the lower door travels along a pair of track rails 210A and B, FIG. 5, that are attached to the door frame to allow the lower door to be stored under the upper door when fully opened, but not in contact therewith. The lower door can only be opened when the upper door is opened. See FIGS. 3 and 5.

Any cited articles, patent applications and patents are incorporated herein as to their teachings.

Accordingly, there is a need for a more compact tailgate when opened.

SUMMARY OF THE INVENTION

The present invention is a means for opening tailgates of vehicles. In the present invention the tailgate has a lower door section and an upper door section that are not fixedly attached to one another. The upper door section comprises the rear glass, if such is there, and mounting means of the upper door section to the vehicle. This would include hinges and positive acting struts. Further including a pair of side guide tracks in the outer frame of the upper door section about the rear glass or panel. The lower door section includes at least four rollers or the like for moving in the guide tracks. A locking and lift handle in the lower door section releases the lower door section to move "vertically" in the guide tracts. An upper detent or locking means or similar device would hold the lower door section on the outside of the upper door section when pushed to the upper extent while in the vertical position. When the handle is release, the lower door section would be locked to the upper door section. At that point the tailgate is lifted into its open position. In order to further provide safety, the unlatched door sensor of the vehicle may be used to prevent unlatching of the lower door section until the upper door section is substantially vertical and secured in the frame of the vehicle.

An object of the present invention is to provide a tailgate system having an improved opening.

It is another object of the present invention to provide a tailgate system having a split door with an upper and lower doors/sections.

It is another object of the present invention to provide a tailgate system having a split door with an upper and lower doors/sections that provide greater access.

It is a further object of the present invention to provide a tailgate system where the lower door is piggy-back or astride on the upper door when open.

It is still a further object of the present invention to provide a tailgate system that may be automated.

It is yet a further object of the present invention to provide a tailgate system that is further more securely held when opened.

It is yet a further object of the present invention to provide a tailgate system that securely locks the lower door section to the upper door section, and prevents the removal accidental or otherwise of the lower door section until commanded.

It is yet a further object of the present invention to provide a tailgate system that may be modified to function on any vehicle having a tailgate.

These and other objects, features, and advantages of the present invention will become more readily apparent from the attached drawings and the detailed description of the preferred embodiments, which follow.

BRIEF DESCRIPTION OF THE DRAWINGS

FIGS. 10A, 10B, 10C and 10D are side cross sectional views as follows: FIG. 10A shows the tailgate being initially closed. FIG. 10B shows the lower door section being moved onto the upper door section. FIG. 10C shows the lower door section upon the upper door section in a locked condition. FIG. 10D illustrates partially the guide track with a roller bracket with a wheel thereon or similarly.

FIG. 13 illustrates a means to prevent the release of a wheel from the guide track by use of a double swinging door.

Figure 1:
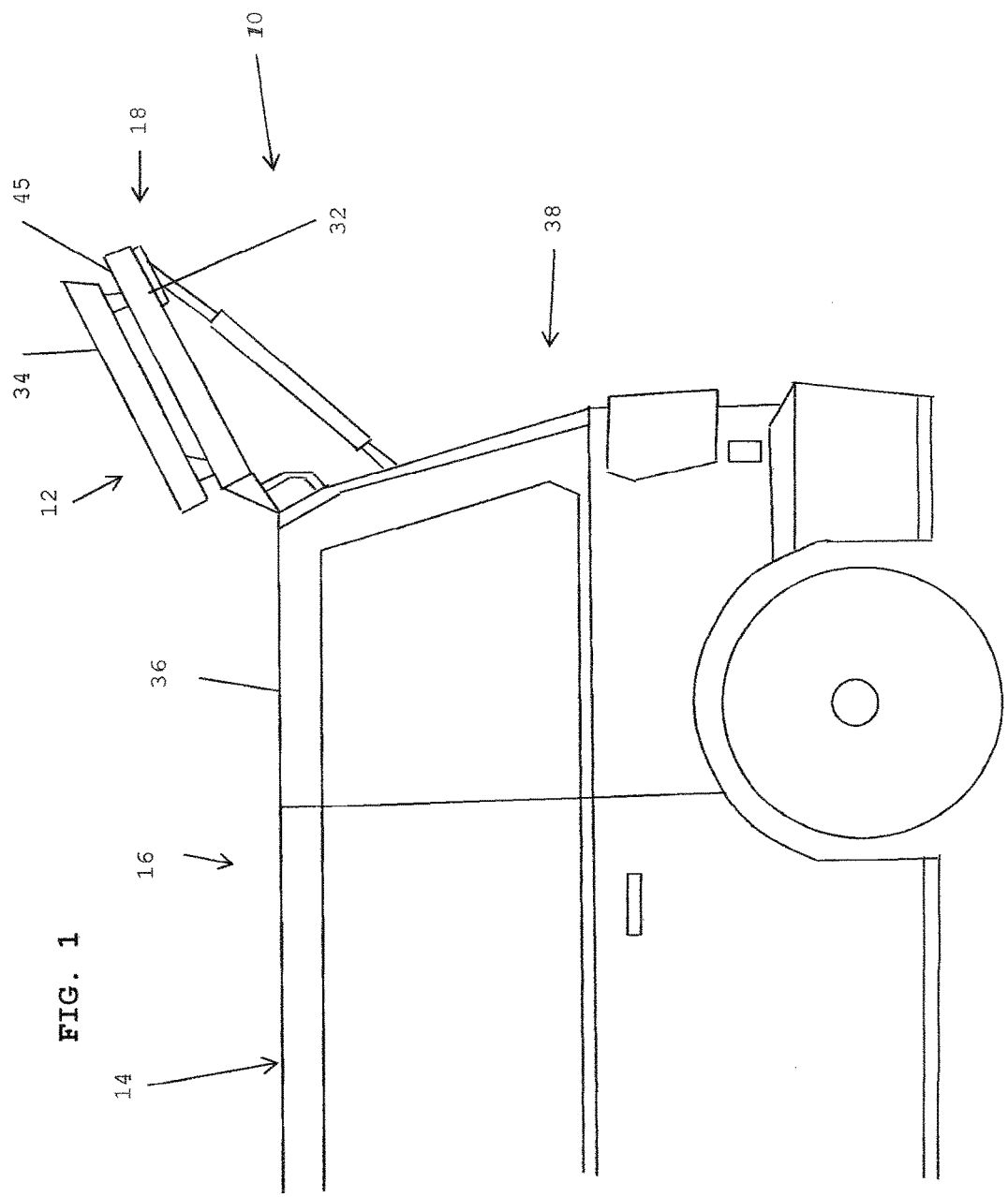
FIG. 1 is a side view of the present invention where the tailgate is fully opened and supported on positive pressure struts, and further shows the lower door section upon the upper door section.

Like reference numerals refer to like parts throughout the several views of the drawings. The drawings are representations of various aspects of the present invention, and clearly one skilled in the art would be able to devise other possible means and devices for accomplishing the same features knowing of the present invention.

DETAILED DESCRIPTION OF THE PREFERRED EMBODIMENTS

In general, the present invention is a means for opening tailgates of vehicles having a horizontally split tailgate. Such a tailgate has a lower door section and an upper door section. The upper door section comprises the rear glass, if such is there, and mounting means of the upper door section to the vehicle. This would include hinges and positive acting struts. The mounting means includes a pair of side guide tracks in the outer frame of the upper door section about the rear glass or panel. The lower door section includes at least four rollers for moving in the guide tracks. A locking and lift handle in the lower door section releases the lower door to move vertically in the frame guide tracts. An upper detent or locking means or similar device would hold the lower door section on the outside of the upper door section when pushed to the upper extent. When the handle is release, the lower section would be locked to the upper section. At that point the tailgate is lifted into its open position.

Referring to FIG. 1, a tailgate system 10 for improved opening and closing of a tailgate 12 of a vehicle 14 is provided. The vehicle may be a minivan 16, but can be adapted to almost any vehicle. A split tailgate 18 is removably mounted in a frame 38 of the vehicle 14 with the split tailgate 18. An upper door section 32 is hinged to a roof 36 of the vehicle 14, and the lower door section 34 is not hinged to the upper door section 32 or the vehicle 14 or fixedly connected thereto. The lower door section 34 is mounted astride or on top of the upper door section 32 and is translatable upon the upper door section 32 in a predetermined manner. The lower door section 34 is located upon an outer surface 45 of the upper door section 32 when the tailgate is opened.

Figure 2:
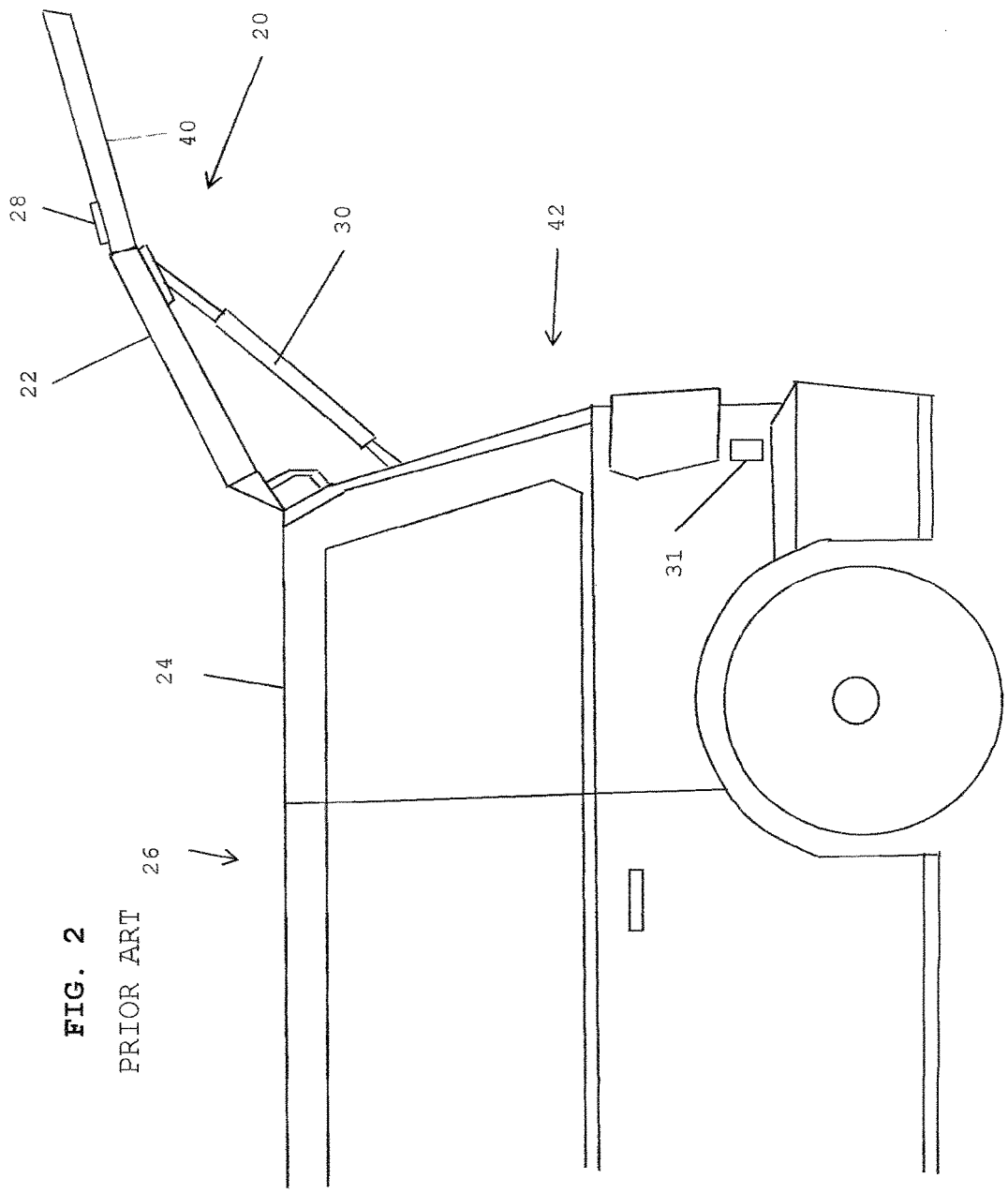
FIG. 2 is a side view of the prior art tailgate being a single door and in the opened mode.

FIG. 2 is a side view of a conventional tailgate 20 wherein the upper door section 22 is hinged to a roof 24 of the vehicle 26. An opening and closing handle 28 is attached to the lower section 40 which is fixedly attached to or integrally formed to the upper door section 22. A positive force strut 30 is pivotally mounted to the vehicle frame 42 and to the upper section 22 and assists in opening of the tailgate 20 since the tailgate 20 is about double the length of the present invention. In the present invention, a handle 29, FIG. 9, includes a trigger therein to actuate locking devices on the tailgate. An open tailgate sensor(s) 31 being convention may be used to prevent the actuation of the trigger if the tailgate is not in a closed condition in the present invention.

Figure 3:
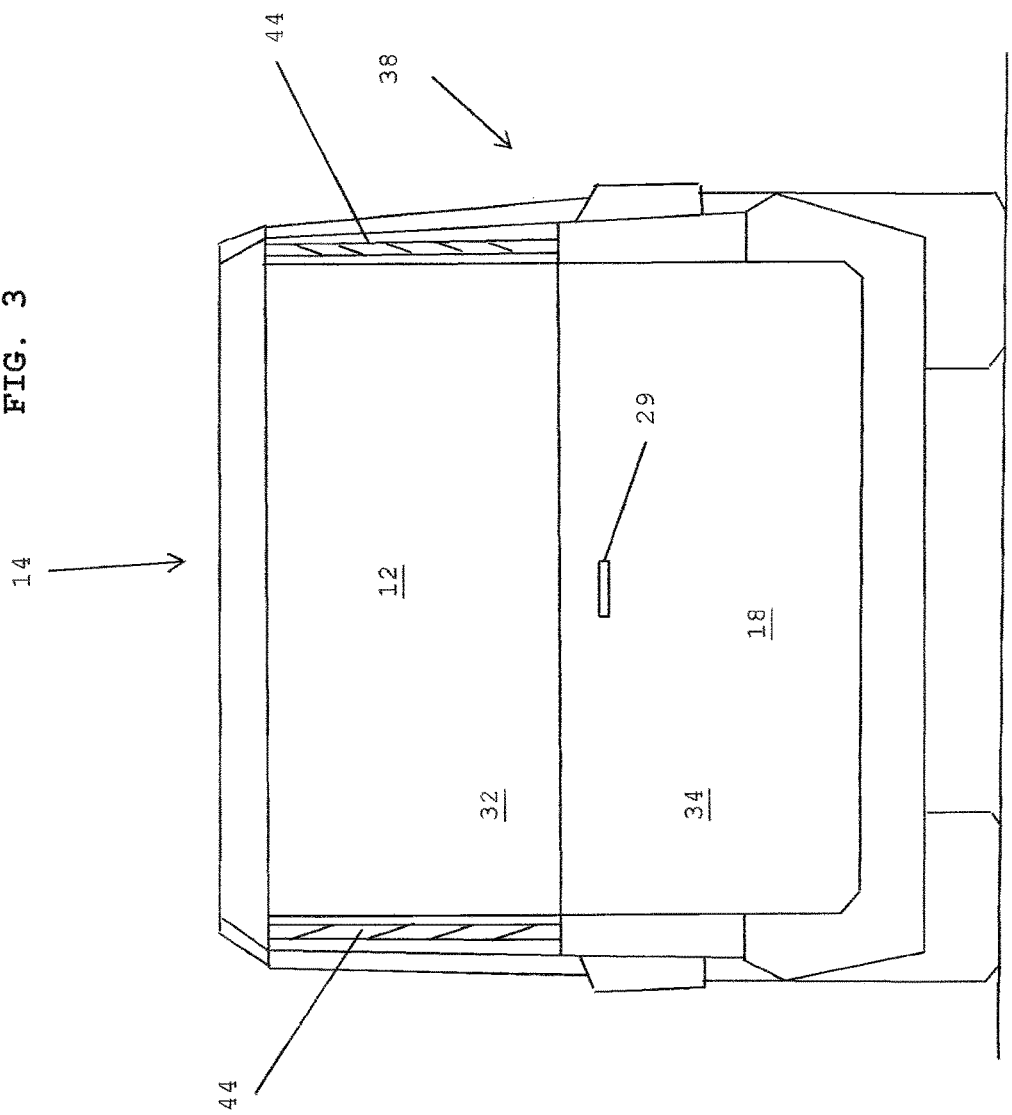
FIG. 3 is a rear view of the present invention where the tailgate is closed, and further shows the lower door section and the upper door section in a rear frame of a van or like vehicle with tracks in the outer edge of the upper door.

FIG. 3 illustrates the rear view of the vehicle 14 and shows the guide tracks 44 that are located in the left and right side of the upper door section 32.

Figure 4:
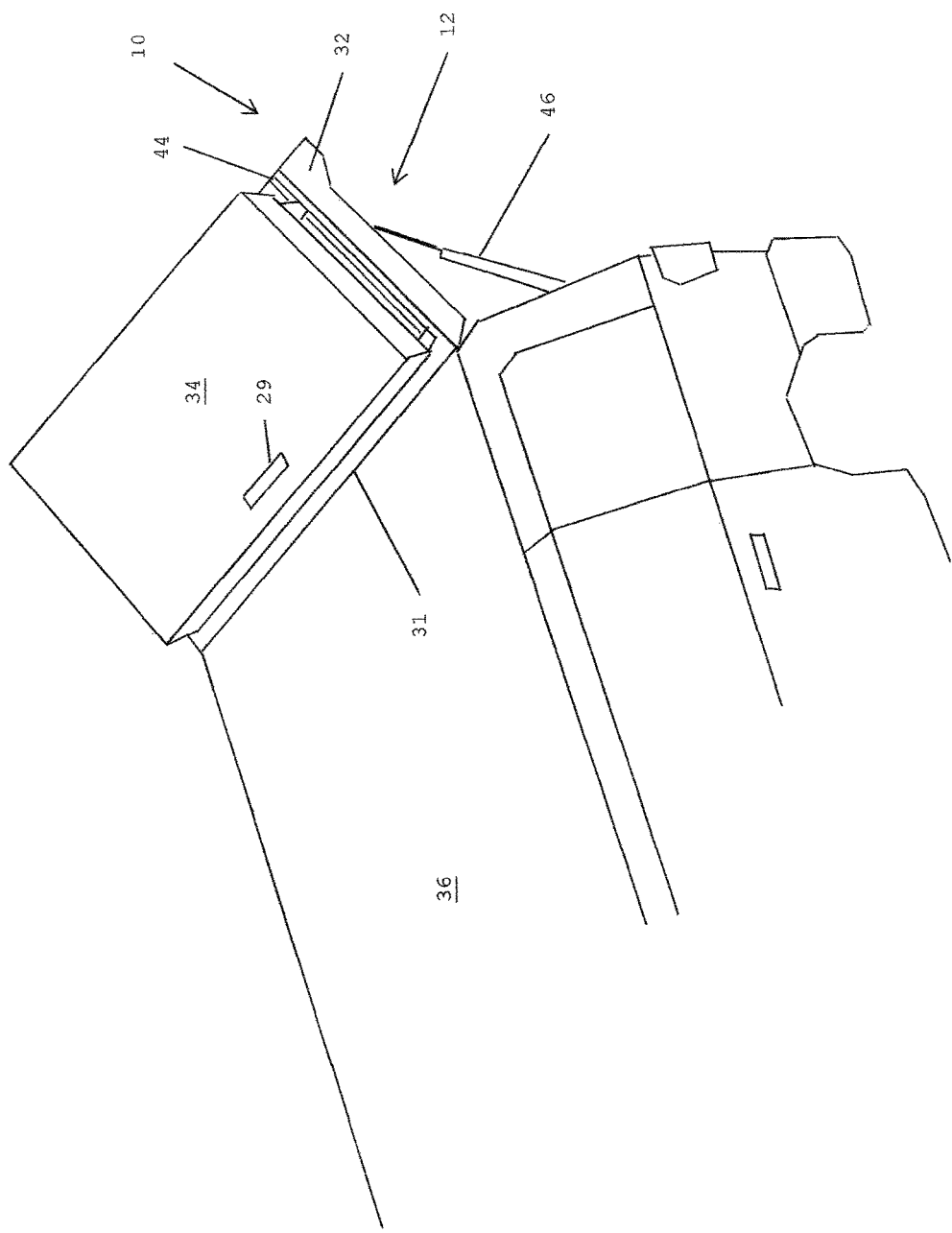
FIG. 4 is a top perspective view of the present invention where the tailgate is fully opened and supported on positive pressure struts, and further shows the lower door section upon/astride the upper door section.

FIG. 4 is the top perspective view of the tailgate 12 fully opened and supported on positive pressure struts 46, one shown, and further shows the lower door section 34 upon/astride the upper door section 32.

Figure 5:
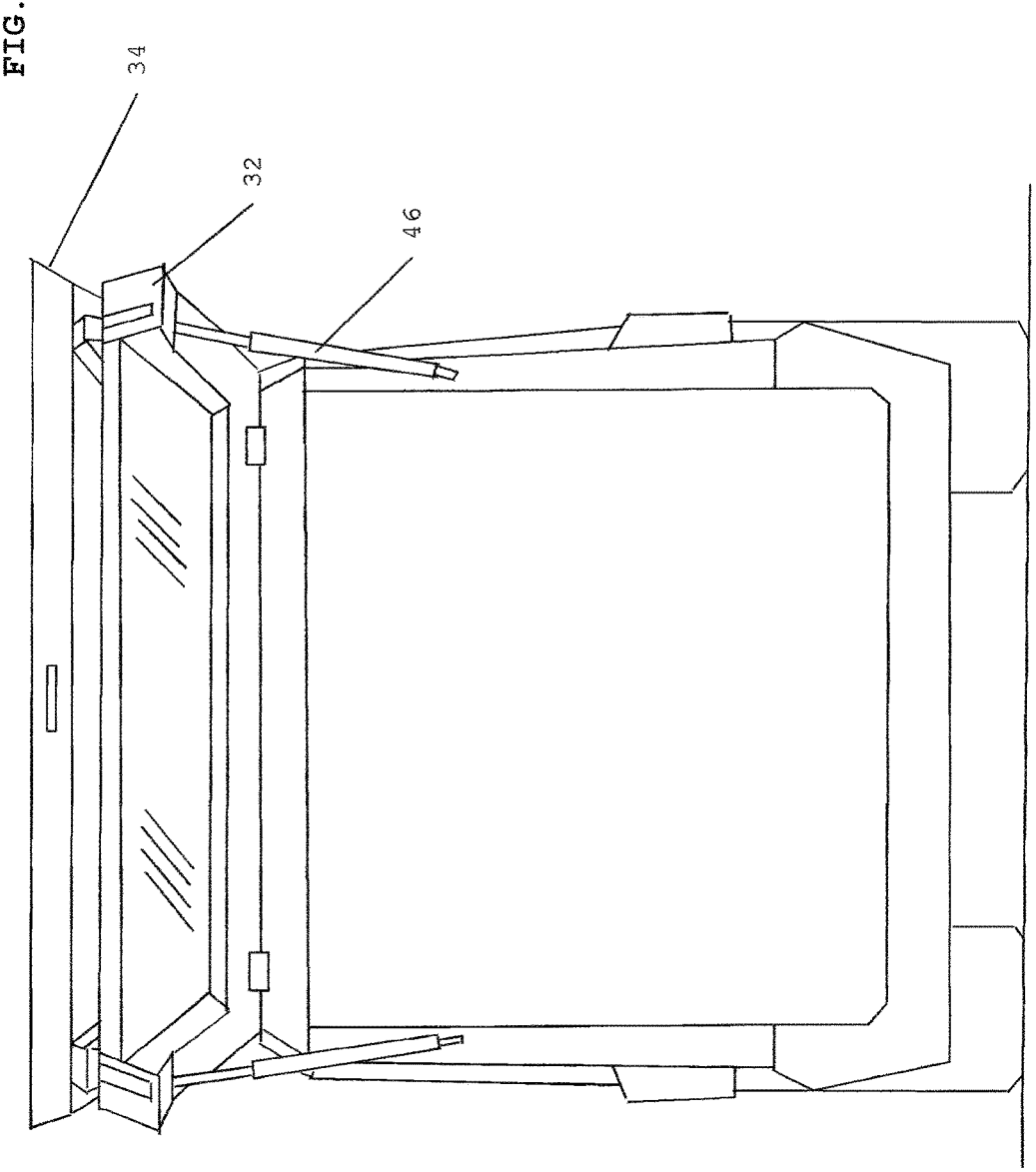
FIG. 5 is a rear view of the present invention where the tailgate is fully opened and supported on positive pressure struts, and further shows the lower door/section upon the upper door/section.

FIG. 5 is a rear view of the present invention where the tailgate 12 is fully opened and supported on positive pressure struts 46, and further shows the lower door section 34 upon the upper door section 32.

Figure 6:
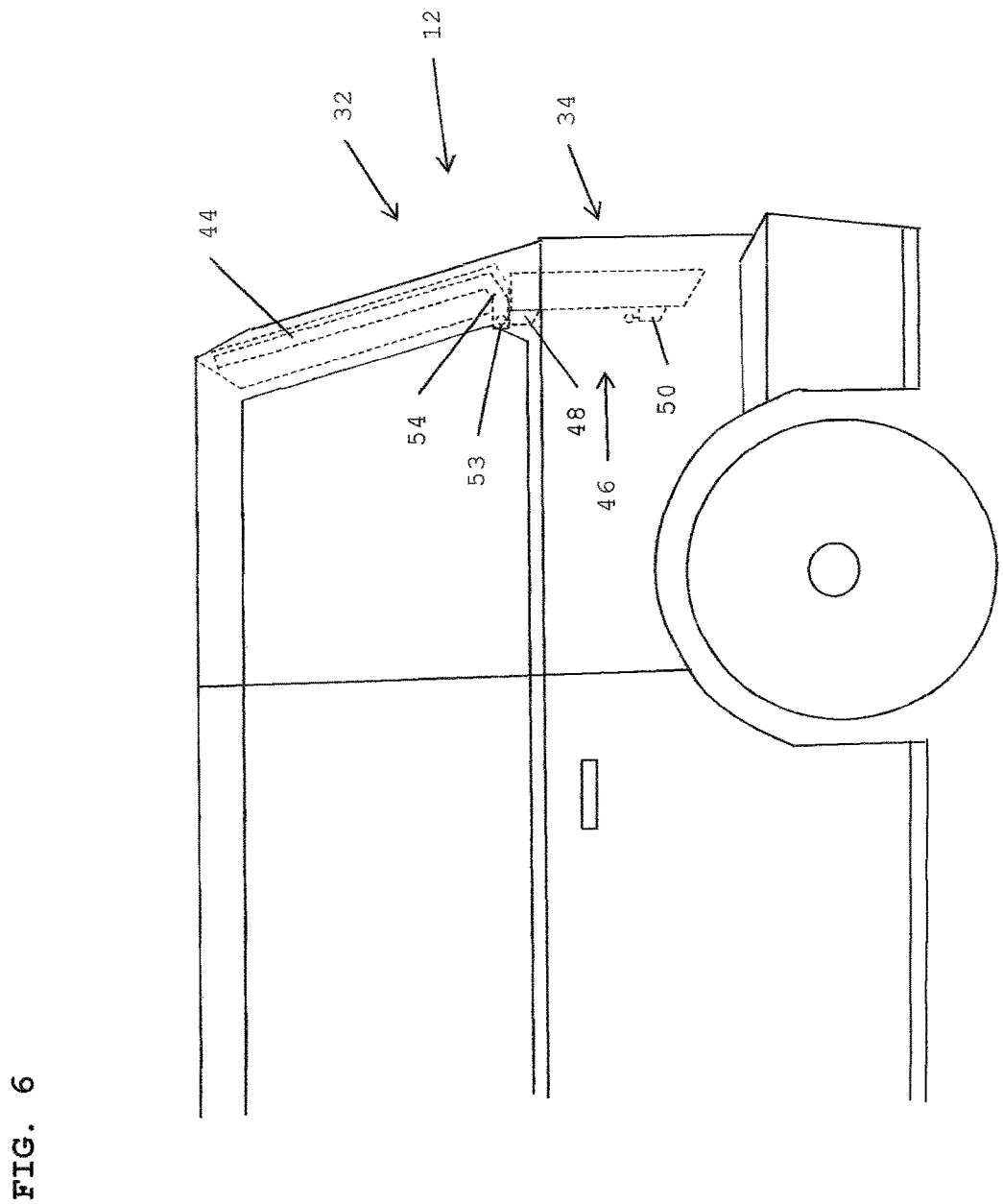
FIG. 6 is a side view of the present invention where the tailgate is closed and shown in outline of the upper door section above the lower door section.

FIG. 6 is a side view of the present invention where the tailgate 12 is closed and shown in outline of the upper door section 32 above the lower door section 34 with one set of side guide tracks 44 on the left side as seen from the rear. The lower door section 34 has a pair of "rollers" 46, one being the upper roller bracket 48, and the lower roller bracket 50. The upper roller bracket 48 has a "wheel" 53 engaged into the lower end 54 of the guide tracks 44. Although a wheel 53 is shown in this embodiment, other equivalent structures such as a post may be used. The upper roller bracket 48 must engage the lower end 54 of the guide track 44 so as to prevent the removal of the lower door section 34 when the tailgate 12 is closed. See FIGS. 10A, 10B and 10C.

Figure 7:
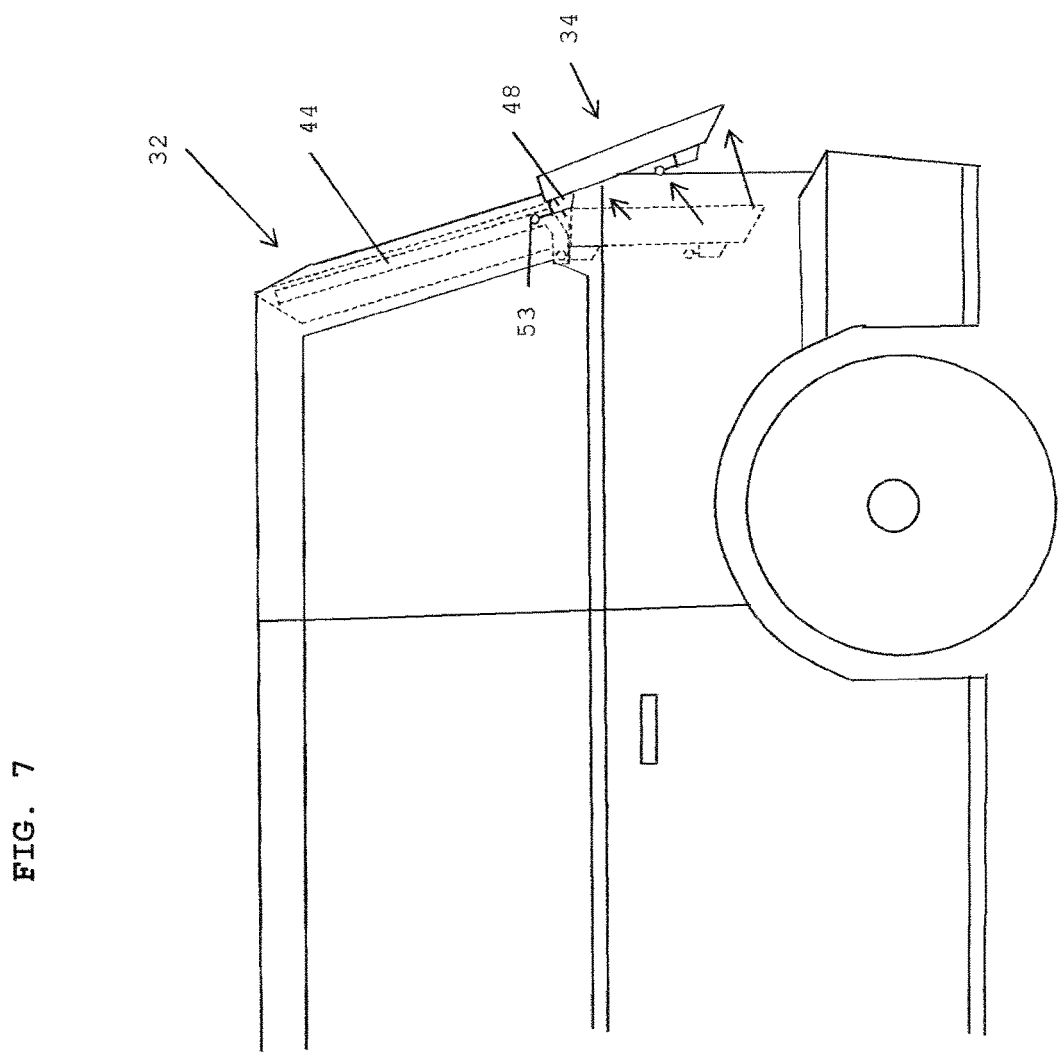
FIG. 7 is a side view of the present invention like FIG. 6 where the tailgate is being opened where the lower door section is being moved upwards onto the upper door section.

FIG. 7 is a side view of the present invention like FIG. 6 where the tailgate 12 is being prepared for opening where the lower door section 34 is being moved upwards onto the upper door section 32 as the upper roller bracket 48 moves in the track 44. The upper section of the lower door section 34 must be pulled outwards so that the wheel 53 then travels in the track 44.

Figure 8:
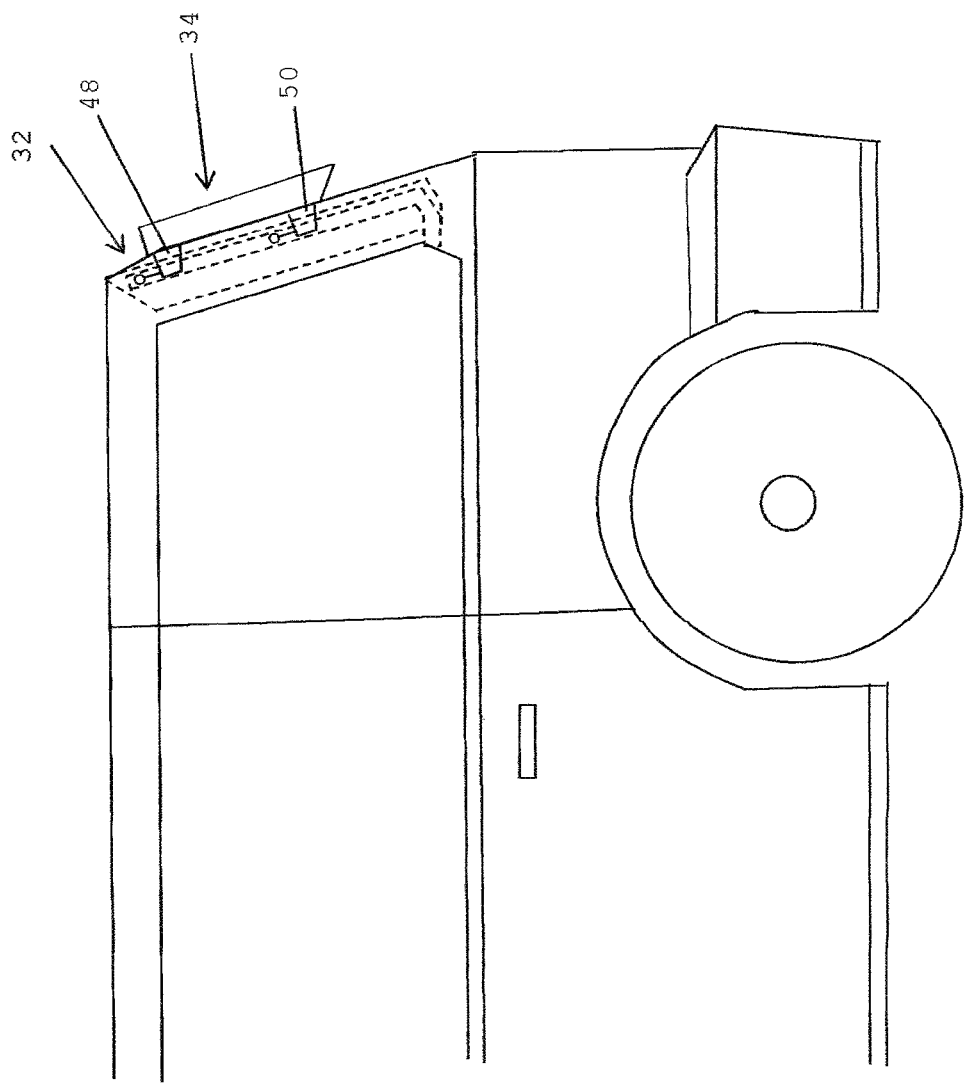
FIG. 8 is a side view of the present invention like in FIG. 7 where the tailgate is being opened where the lower door section is positioned over the upper door section before it is swung open.

FIG. 8 is a side view of the present invention like in FIG. 7 where the tailgate 12 is being prepared for opening where the lower door section 34 is positioned over the upper door section 32 and the upper roller bracket 48 is at the end of the guide track 44, and the lower roller bracket 50 is also engaged with the guide track 44. See FIGS. 10A, 10B and 10C for additional details.

Figure 9:
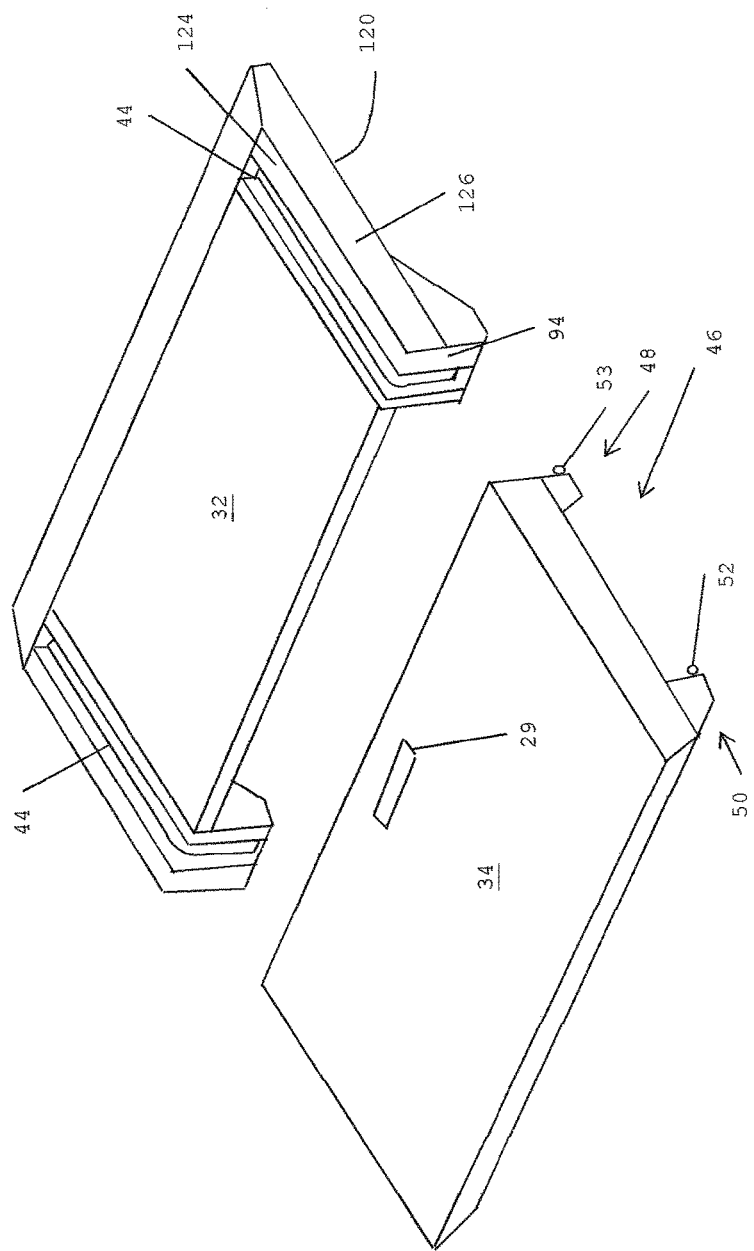
FIG. 9 is a perspective view of the present invention showing the upper door section and the lower door section separated to show the tracks and wheels.

FIG. 9 is a perspective view of the present invention showing the upper door section 32 and the lower door section 34 separated to show the tracks 44 and wheels 52 and 53. In this embodiment, the guide track 44 is generally shaped as an "L", with the lower leg, shorter, pointing inwards to the vehicle 14. The upper wheel 53 is engaged and locked into the lower L leg 60, initially, and held there by a lock as will be discussed below.

Figure 10A:
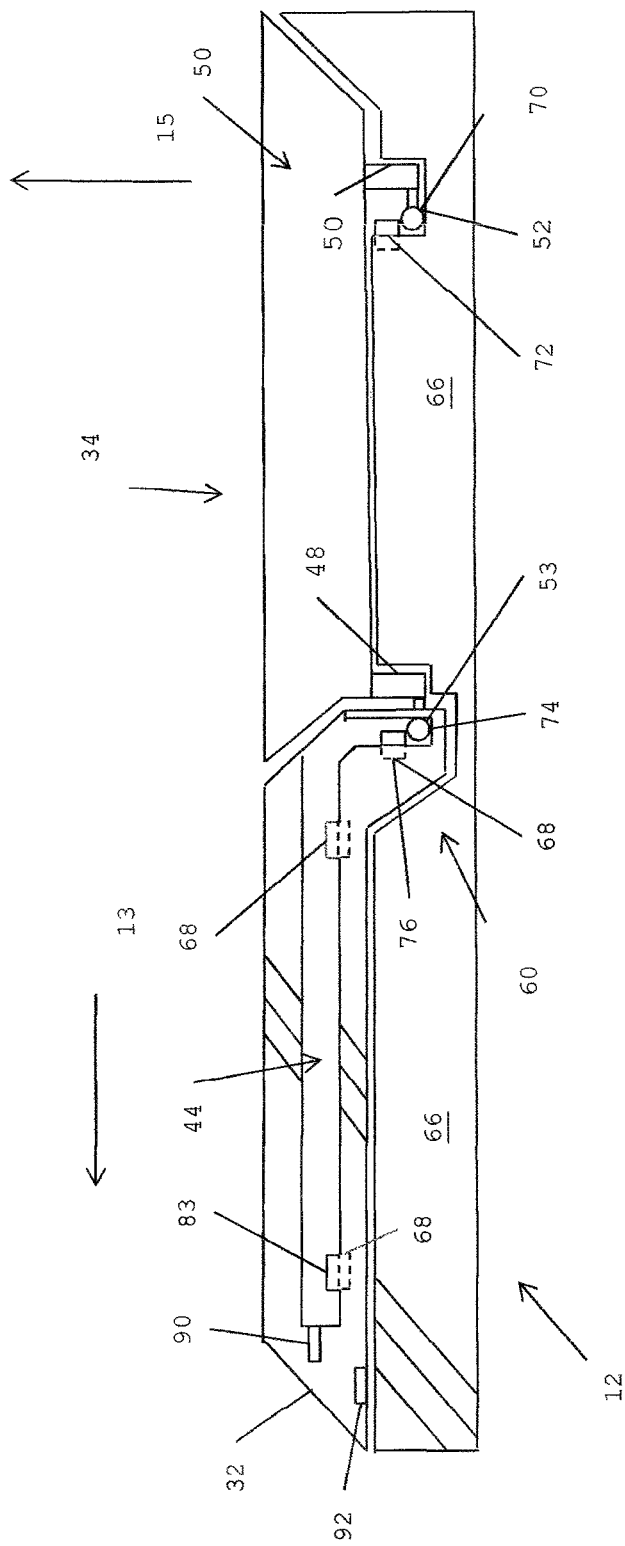
Figure 10B:
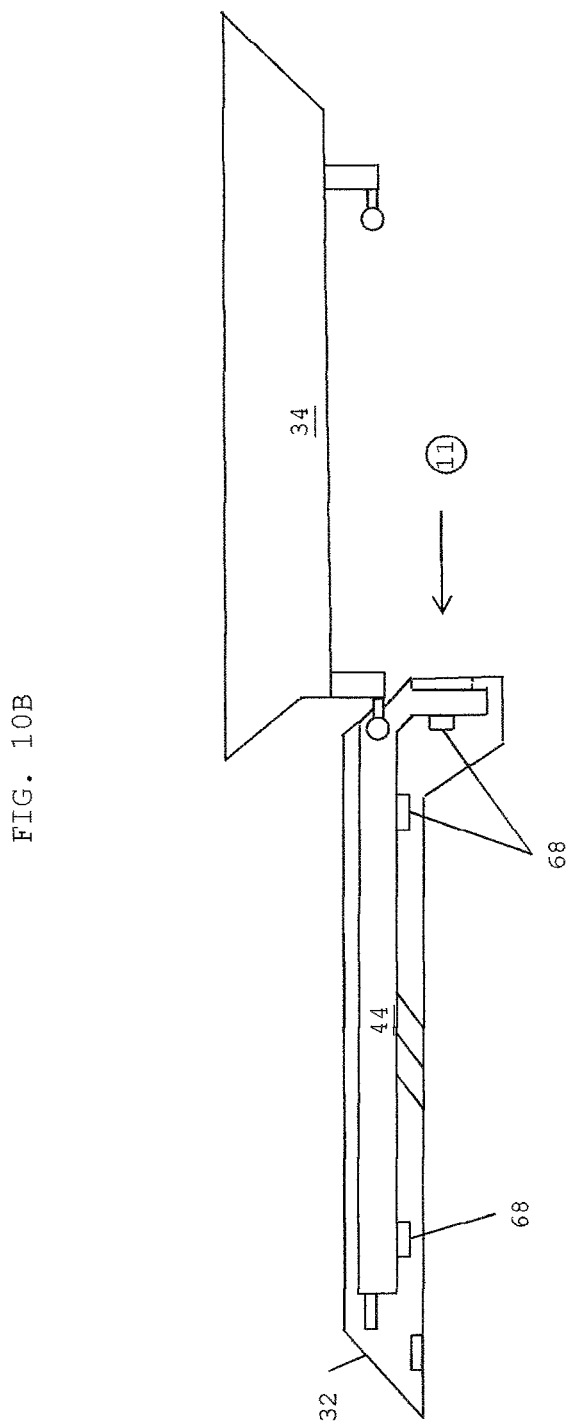

FIGS. 10A, 10B, and 10C are side cross sectional views of the present invention where the tailgate is initially closed, FIG. 10A, and partially engaged, FIG. 10B, and fully engaged, FIG. 10C, with the lower door section 34 moving onto the upper door section 32. Reference is made to article entitled, "Electromagnetic Lock," in Wikipedia, 4 pages, and included as a reference, as well as "Mortise Bolt Lock," product, 2 pages, also a reference. As seen in FIG. 10A, the upper wheel 53 in engaged in the guide track 44 in the shorter leg section 60, when the tailgate 12 is still closed. The vehicle frame 66 is design to have the tailgate 12 fit closely therein. The vertical direction is noted by the arrow 13 in FIG. 10A. Four electromagnetic locks 68 are shown, noted as "lock" hereafter, as small squares that move into and out of the appropriate area/or channel as seen on command via a computer processor running a program having a flow chart as noted in FIG. 12. For example, the lower wheel 70/52 of the lower door section 34 is prevented from moving by a lock 72 and this further prevents the lower door section 34 from falling or swinging outward (being in a vertical direction in FIG. 10 as noted by arrow 15 or as the horizontal direction with vehicle 14. The upper wheel 74/53 is secured in the short leg of L-shaped section 60 by a lock 76. In this manner, the lower door section 34 is secured to the vehicle 14. In FIG. 10B, all the locks are activated and withdrawn. The lower door section 34 is pulled outwards or in the direction of arrow 15 and pushed upwards in the direction of arrow 13 so as to move the upper wheel 74/53 into a longer leg of the L-shaped channel 44. Once in that position, the lower door section is pushed upwards, to the left, until the wheel 74/53 comes to the end 80, FIG. 10C, of the L-shaped channel 44 as seen in FIG. 10C. At that point a sensor 90 deactivates the locks 82 which then enter into the channel 44 to block the wheels 70/52 and 74/53 from moving. It should be understood, that the locks 82 are normally open, with a plunger 83 extended into the channel 44. Only when the lower door section 34 is being moved to open or close the tailgate 12, will the locks be activated to a closed position, plungers 83 withdrawn. A doorway 84, FIG. 10C, in the channel 44 allows the lower wheel 52 to enter therein or to exit therefrom since the upper wheel 53 is already engaged therein. A double swinging door 150, FIG. 13, with a limited swing may be used in the doorway 84 to prevent the upper wheel 53 from being accidentally removed or an overhanging shelf to block the doorway. Further features may include sensors 90 to detect the presence of the wheel thereat and such sensors may be magnetic or push contact sensor or a similar sensor for detecting the presence of metal. Another feature may be a vertical sensor 92 in the tailgate 12 or vehicle 14 to detect whether the upper door is substantially vertical in the vehicle frame. This may be the conventional open door signal as shown by a light in the dash. This would prevent the movement of the lower door section if the upper door section is not properly secured. FIG. 10D partially illustrates the wheel 52 being attached to the lower roller bracket 50, others being similar, the lower roller bracket 50 being L-shaped with wheel 52 attached thereon. The short leg of the lower roller bracket 50 may be an axial for the wheel 52. Further, "wheel" 52" may be a guide rod with a plastic sleeve thereon that slides in the channel 44.

Figure 11A:
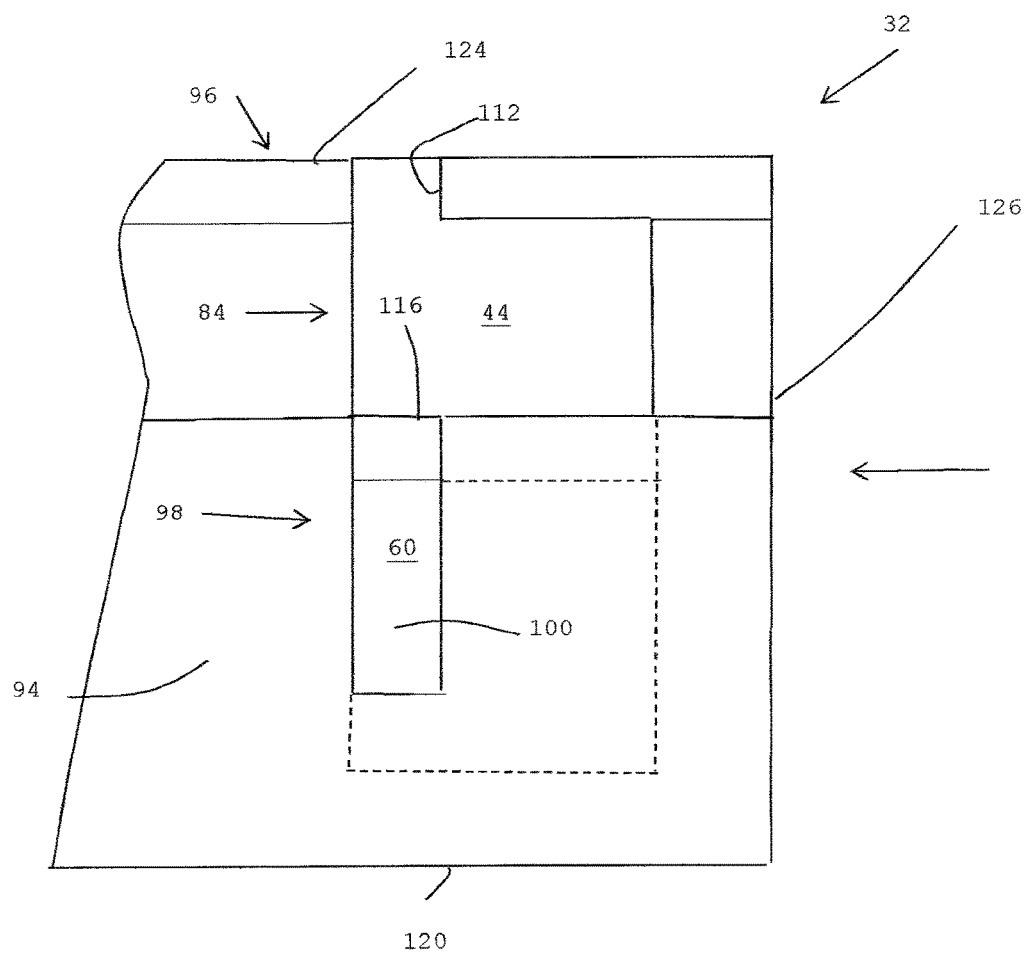
FIG. 11A is a partial view of the bottom of the right side of upper door section.
Figure 11B:
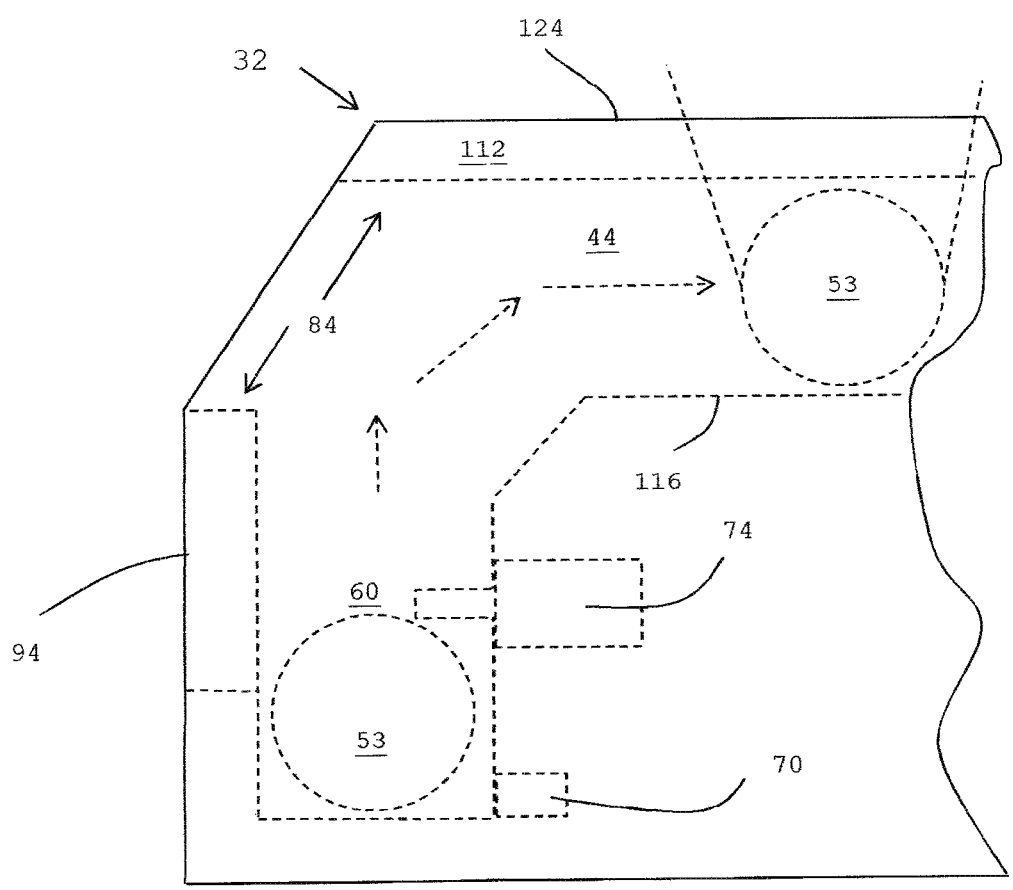
FIG. 11B is an outlined view from the right side of the bottom of the upper door section showing the position of one wheel therein.

Referring to FIG. 11A and FIG. 11B, FIG. 11A is a front view of the guide track/channel 44 as seen by an arrow in FIG. 10B. FIG. 11B is a side view of FIG. 11A. As seen therein, a guide track 96 is basically an L-shaped structure 98 with a short leg 100 and a long leg 116. An upper door section wall 32 is partially shown. Also shown partially are an outer edge 124, a lower edge 94, a right hand side and a left hand side, not shown, with an upper edge 31, FIG. 4, being hinged to the vehicle 14. In this embodiment, referring back to FIG. 10C and FIG. 10D, the wheels 52, 53 are attached to an L-shaped roller bracket 48 and 50 that are attached to the lower door section 34, FIG. 10D, at a long leg 104. The short leg 102 has the wheel 52, 53 mounted thereon.

In FIG. 11B, the wheel 53, shown in outline, when the tailgate 12 is closed, is engaged in the short leg 60 of the channel 44. The roller bracket 104 is positioned in the first roller bracket doorway 100. When the lower door section 34 is being opened, the roller bracket 104 is moved upwards as seen in FIG. 11B into a second roller bracket doorway 112 and the lower door section 34 is then pushed vertically into the channel 44. The wheel 53 is then moved to the end of the channel 44 to position 80, FIG. 100. The guide track 44 is essentially rectangular shaped having the doorways 100 and 112 therein and running its length as shown, in for example, FIG. 9. As the lower door section 34 is moved, the lower wheel 52 enters into the guide track 44 via the entrance 84. Both of the wheels 52 and 53 are positioned in the guide track 44 when the tailgate 12 is fully opened, FIG. 10C. Locks 82, FIG. 10C, are engaged to hold the lower door section securely therein. In this embodiment, specific structures are shown for the present invention, but it should be understood that one skilled in the art would be able to design equivalent structures to accomplish the purpose of the invention. For example, a dual guide track may be used, one for the upper wheel 53 and the other for lower wheel 52 and thus the device of FIG. 13 is not required.

Referring to FIG. 13, the wheel 53, being the upper wheel on the lower door section 34 is being moved into the channel 44. In order to prevent the accidental release of the wheel 53, a double swinging door 150 is mounted in the short leg 60 of the channel 44. It can swing upwards or downwards as seen in the FIG. 13. On the upwards swing, the upper surface hits the overhang 154 and thus the wheel 53 cannot exit. Once the wheel 53 is into channel 44, the swinging door 150 returns to the position as shown. In this position the wheel 52, being the lower wheel on the lower door section 34 can enter into the channel 44 as seen in FIG. 10C. When the tailgate 12 is closed, and the locks released, wheel 52 is removed from the upper door section 32 and returns to the stored section as seen in FIG. 10A. Wheel 53 will then be pushed into the short leg 60, the swinging door will move downwards to allow the wheel 53 to enter into a locking section at the bottom of short leg 60, as seen in FIG. 10A.

Figure 12:
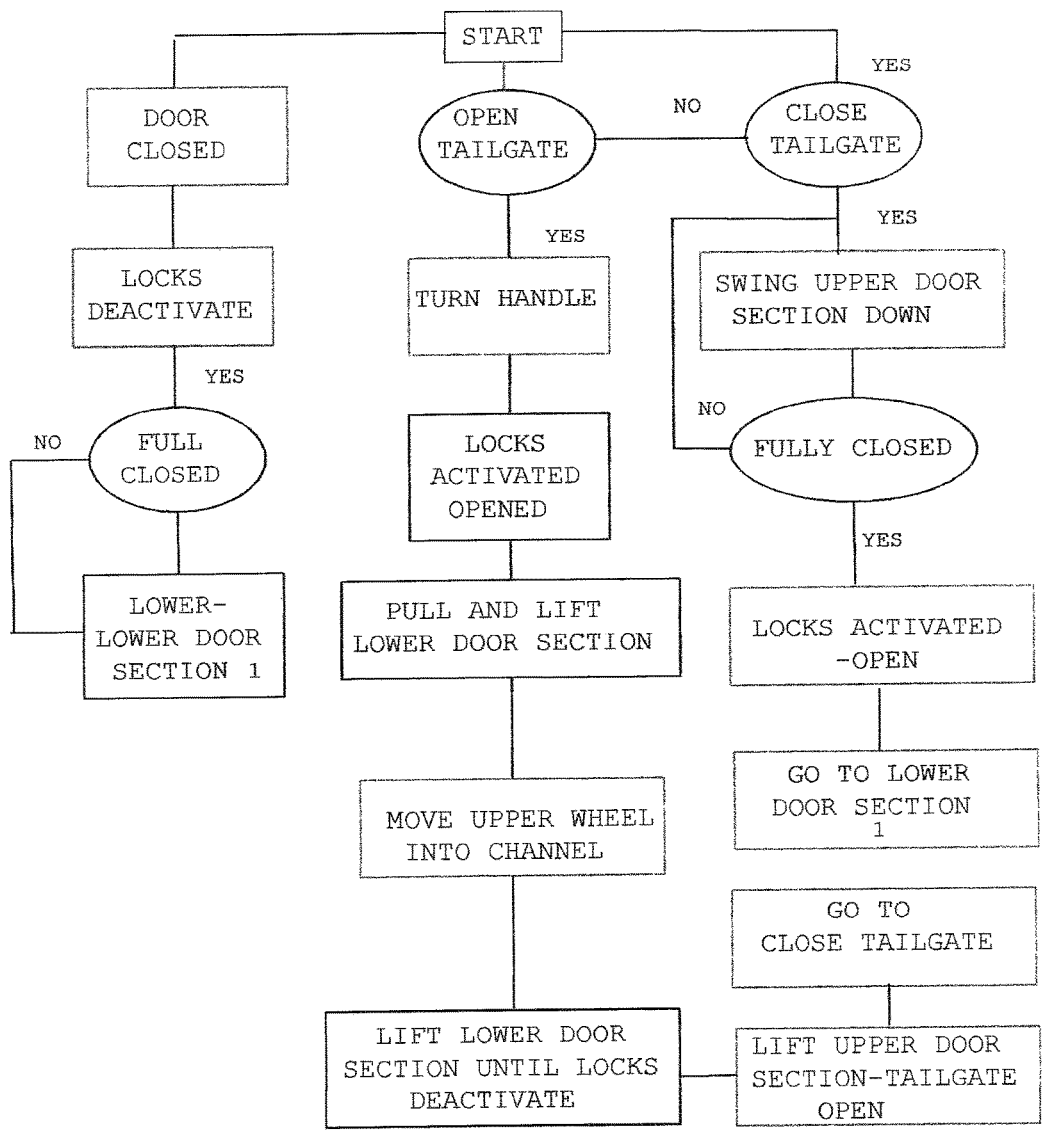
FIG. 12 is a flow chart that shows the steps in operating the present invention.

FIG. 12 is flow chart of the process of opening and closing of the tailgate 12. The steps therein are fully described. An emergency release may be activated in an accident to allow the tailgate to be opened from either the inside or outside. An emergency power source may be required since power is required to activate the locks. They are normally in an open condition when the plungers are extended. When power is applied, the locks are activated and put in closed condition with the plungers withdrawn.

The present invention provides a method of opening a tailgate of a vehicle like a minivan and comprises the steps of: releasing locks holding the tailgate in a vehicle frame by actuating a trigger located in a handle; lifting a lower door section away from the vehicle frame; pushing the lower door section upwards after lifting; sliding the lower door section along guide tracks on an outer surface of an upper door section; stopping the sliding when the lower door section reaches an end travel in the guide tracks; engaging the locks to hold the lower door section on top of the upper door section; lifting the upper door section to an open position with the lower door section mounted thereon; and reversing the above steps to close the tailgate. This method is further aided by having sensors located in the upper door section of frame for detecting a position of the upper door section, such that the lower door section is only removable when the upper door section is substantially vertical in orientation.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A tailgate system for improved opening and closing of a tailgate of a vehicle, said tailgate system comprising:
    a split tailgate, said split tailgate being removably mounted in a frame of the vehicle, said split tailgate having an upper door section and a lower door section, said lower door section not being hinged or fixedly attached to said upper door section or the vehicle;
    said lower door section being translatable upon a pair of guide tracks running up a left side and a right side of an outer surface upon said upper door section, said lower door section capable of being located upon said outer surface of said upper door section when said tailgate is operably opened, said guide tracks running from a lower edge to an upper edge and having a locking device for securing said lower door section on said upper door section.

2. The tailgate system as defined in claim 1, wherein said locking device is electro-magnetic, wherein said locking device extends and retracts one or more locks.

3. The tailgate system as defined in claim 2, wherein there are at least four locking devices, two in each guide track.

4. The tailgate system as defined in claim 3, wherein one or more locking devices secure said lower door section to the vehicle.

5. The tailgate system as defined in claim 1, further including an opening device on said lower door section outer surface.

6. The tailgate system as defined in claim 5, further including a trigger to actuate locking devices on said tailgate, said trigger being located in the opening device.

7. The tailgate system as defined in claim 1, further including sensors to detect a position of said upper door section, wherein said lower door section is only removable when said upper door section is substantially vertical in orientation.

8. The tailgate system as defined in claim 1, further including one or more sensors for detecting positions of said lower door section in said guide tracks.

9. The tailgate system as defined in claim 8, wherein said sensors are magnetic or lever actuated.

10. The tailgate system as defined in claim 1, wherein said lower door section has a pair of rollers on each side of said lower door section, each roller having a wheel, and connected to said lower door section by a bracket.

11. The tailgate system as defined in claim 10, wherein each guide track is an L-shaped channel and has a bracket doorway to allow access of said roller along the length of said channel, said guide track having said upper roller of said lower door section held initially in a short leg of said L-shaped channel.

12. The tailgate system as defined in claim 11, wherein said guide track channel further includes an entrance for the lower roller of said lower door section, wherein said lower door section rollers are located in said guide track channels when positioned on top of said upper door section.

13. The tailgate system as defined in claim 12, further including a locking device for said lower roller of said lower door section to secure said lower door section in the vehicle until said locking device releases the lower roller.

14. The tailgate system as defined in claim 1, wherein guide pins, at least 4, are mounted in said lower door section and are adapted to move within said guide tracks.

* * * * *